(12) United States Patent  (10) Patent No.: US 8,694,978 B1
Rus et al.  (45) Date of Patent:  Apr. 8, 2014

(54) FUNCTION SIDE-EFFECT MODELING BY PROTOTYPING

(75) Inventors: Silvius V. Rus, San Jose, CA (US); Xinliang David Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 13/072,056

(22) Filed: Mar. 25, 2011

(51) Int. Cl.
  *G06F 9/45* (2006.01)
(52) U.S. Cl.
  USPC ............ 717/154; 717/151; 717/140; 717/141
(58) Field of Classification Search
  None
  See application file for complete search history.

(56) References Cited

U.S. PATENT DOCUMENTS

| | | | |
|---|---|---|---|
| 6,209,040 B1 * | 3/2001 | Acton et al. .................. | 719/315 |
| 6,332,214 B1 * | 12/2001 | Wu ................ | 717/141 |
| 6,487,713 B1 * | 11/2002 | Cohen et al. .................. | 717/105 |
| 6,505,209 B1 * | 1/2003 | Gould et al. .................. | 715/854 |
| 6,856,950 B1 * | 2/2005 | Abts et al. ...................... | 703/13 |
| 6,966,055 B2 * | 11/2005 | Haber et al. ................. | 717/151 |
| 7,010,785 B2 * | 3/2006 | Haber et al. ................. | 717/151 |
| 7,133,874 B2 * | 11/2006 | Hill et al. .............................. | 1/1 |
| 7,181,735 B1 * | 2/2007 | Haraguchi et al. ............ | 717/151 |
| 7,275,184 B2 * | 9/2007 | Wolff et al. ..................... | 714/39 |
| 7,356,813 B2 * | 4/2008 | Liu et al. ....................... | 717/163 |
| 7,418,699 B2 * | 8/2008 | Metzger et al. ............... | 717/162 |
| 7,657,878 B2 * | 2/2010 | Ota ............................... | 717/143 |
| 7,921,418 B2 * | 4/2011 | Nair et al. ..................... | 717/151 |
| 8,108,842 B2 * | 1/2012 | Brown et al. ................. | 717/136 |
| 8,291,397 B2 * | 10/2012 | Ahuja et al. .................. | 717/154 |
| 8,402,438 B1 * | 3/2013 | Andrews et al. ............. | 717/126 |
| 2002/0010911 A1 * | 1/2002 | Cheng et al. ...................... | 717/4 |
| 2002/0016953 A1 * | 2/2002 | Sollich ............... | 717/1 |
| 2004/0040016 A1 * | 2/2004 | Pearce et al. ................... | 717/141 |
| 2004/0153448 A1 * | 8/2004 | Cheng et al. ...................... | 707/4 |
| 2007/0168931 A1 * | 7/2007 | Martin et al. ................. | 717/104 |
| 2009/0077543 A1 * | 3/2009 | Siskind et al. ................ | 717/136 |
| 2009/0199168 A1 * | 8/2009 | Hamada et al. ............... | 717/151 |
| 2011/0246962 A1 * | 10/2011 | Meijer et al. .................. | 717/106 |

OTHER PUBLICATIONS

A Method for Determining THC Side Effects of Procedure Calls—Banning, John Phineas—Aug. 31, 1978 IP.com No. IPCOM000150631D.*
MSDN: Visual Studio 2008, published by Microsoft at http://msdn.microsoft.com/en-us/library/t69a74ty(v=vs.90).aspx , Date: 2008.*
Switches for gcc, gcc 4.1.2, release date Feb. 13, 2007 http://gcc.gnu.org/onlinedocs/gcc-4.1.2/gnat_ugn_unw/Switches-for-gcc.html.*
Enterprise COBOL compiler options, IBM, Copyright 2005 http://pic.dhe.ibm.com/infocenter/pdthelp/v1r1/index.jsp?topic=%2Fcom.ibm.entcobol.doc_3.4%2Figyc1plc.htm.*

(Continued)

*Primary Examiner* — Isaac Tecklu
*Assistant Examiner* — Hossain Morshed
(74) *Attorney, Agent, or Firm* — Honigman Miller Schwartz and Cohn LLP

(57) ABSTRACT

Methods, systems, computer-readable media, and apparatus for determining function side effects of a program function are disclosed. Source code of one or more prototype functions that is configured to simulate the function side-effect behaviors of a program function can be provided, and the compiler can determine the functional side effects of the program function in various specific program contexts based on the source code of the prototype functions rather than the source code of the program function. Optimization procedures can be performed based on the function side effects of the program function derived from the prototype functions and the program contexts.

24 Claims, 5 Drawing Sheets

(56) References Cited

OTHER PUBLICATIONS

MSDN, Visual Studio 2008, Microsoft, web page captured Dec. 2010 http://msdn.microsoft.com/en-us/library/t69a74ty(v=vs.90).aspx.*

Visual Studio 2008, "Resources Page,Project Designer", Published by Microsoft at http://msdn.microsoftcom/en-us/librart/t69a74ty(v=vs.90).aspx.), 2008.*

"Enterprise COBOL Compiler Options", published by IBM, at http://pic.dhe.ibm.com/infocenter/pdthelp/v1r1/index.jsp?topic=%2Fcom.ibm.entcobol.doc_3.4%2Figyc1plc.htm, 2005.*

Erlang Compiler, published at : http://www.erlang.org/doc/man/compile.html 1997.*

Switches for gcc—GNAT User's Guide, located at http://gcc.gnu.org/onlinedocs/gnat_ugn_unw/Switches-for-gcc.html, 2012.*

* cited by examiner

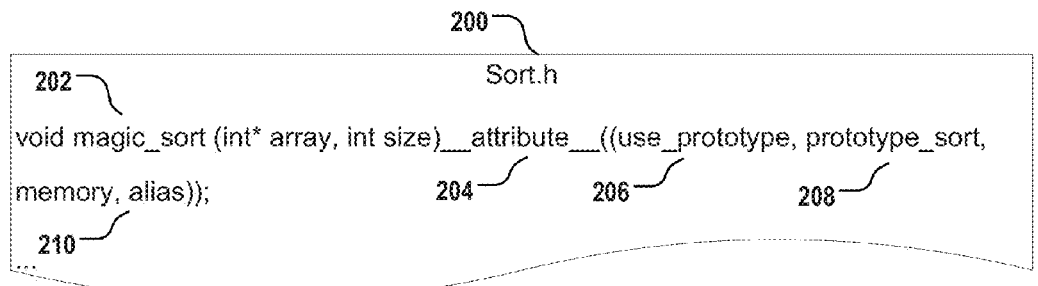
FIG. 2A
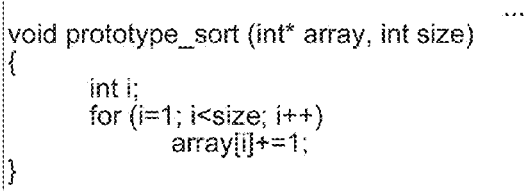
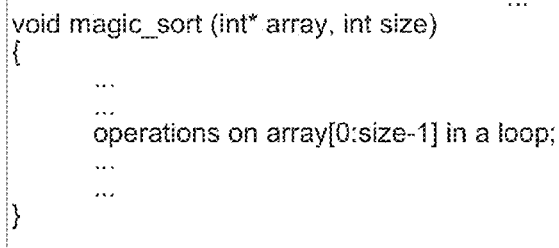
FIG. 2B

230
Table.c

```
int stats;         ─232
void sort_rows ()
{
    int array[];
    ...
    magic_sort(array[], 50);   ─236
    stats+=1;   ─234
    ...
}
```

```
┌─────────────────────────────────────────────────────┐
│ Receive a function declaration for a program        │
│ function, the function declaration referring to a   │
│ first prototype functions for the program function  │
│                                              302    │
└─────────────────────────────────────────────────────┘
                          │
                          ▼
┌─────────────────────────────────────────────────────┐
│ Simulating at least a first function side-effect    │
│ behavior of the program function based on a first   │
│ function side-effect behavior of the first          │
│ prototype function                           304    │
└─────────────────────────────────────────────────────┘
                          │
                          ▼
┌─────────────────────────────────────────────────────┐
│ Based on the simulated first function side-effect   │
│ behavior of the program function, identifying one   │
│ or more optimization procedures for a program       │
│ that includes at least a first call to the program  │
│ function                                     306    │
└─────────────────────────────────────────────────────┘
```

```
┌─────────────────────────────────────────────────────┐
│ Determine a first program context in which the      │
│ first call to the program function occurs in the    │
│ program                                             │
│                                              402    │
└─────────────────────────────────────────────────────┘
                          │
                          ▼
┌─────────────────────────────────────────────────────┐
│ Determine, based on the simulated first function    │
│ side-effect behavior of the program function,       │
│ respective function side-effects of the program     │
│ function that are specific to the first program     │
│ context                                      404    │
└─────────────────────────────────────────────────────┘
                          │
                          ▼
┌─────────────────────────────────────────────────────┐
│ Determine at least some of the one or more          │
│ optimization procedures on the program based on     │
│ the respective function side-effects                │
│                                              406    │
└─────────────────────────────────────────────────────┘
```

FIG. 4

FUNCTION SIDE-EFFECT MODELING BY PROTOTYPING

BACKGROUND

This specification relates to compiler optimizations, and particularly to determination of function side effects of program functions.

A software tool, called a "compiler," can translate a computer program written in a high-level programming language into a set of low-level machine instructions that can be executed by a computer's microprocessor. In the context of this translation, the program written in the high-level programming language is called the "source code." The set of low-level machine instructions are called "object code." In practice, a program typically includes multiple source code files from which a number of object files can be derived. In addition, the source code files may make references or calls to subroutines included in one or more software libraries. These multiple object files and libraries can be linked (i.e., combined) by a "linker" to create a single executable program.

As modern computer programs grow larger and more complex, the sequencing and placement of machine instructions in an executable program can greatly affect the efficiency and speed of the program's execution. Modern compilers can often perform various optimizations during program compilation to produce better performing object code, and consequently, more efficient executable programs. Common optimization techniques include loop optimization, data flow optimization, dead code elimination, inline expansion, constant propagation, and so on. The scope of code optimization can be intra-procedural (i.e., within a single procedure or code block) or inter-procedural (i.e., across multiple procedures or even multiple source code files).

The extent to which various optimization techniques can be applied during the compilation and linking of a computer program can be limited by the side effects that each function or expression can introduce to their respective program contexts in the original program code. Side effects of a program function include modifications to program state or interactions with surrounding expressions and the calling functions by the program function, for example. A compiler typically forgoes particular optimizations on a code block or procedure if the pertinent function side effects of the program functions contained in the code block or procedure cannot be reliably ascertained.

SUMMARY

This specification discloses a framework in which providers of software libraries can supply source code of one or more prototype functions for each library function provided in object code form. The prototype functions of the library function each simulates at least one type of function side-effect behavior (e.g., memory access behavior, aliasing behavior, etc.) of the library function. The prototype functions can be simpler for the compiler to analyze and does not need to include proprietary details that exist in the source code of the library function. The compiler may create a side-effect summary (e.g., a summary file containing descriptions of one or more types of function side-effect behaviors) for the library function based on an analysis of the prototype functions performed at compile time. The compiler can further ascertain the exact side effects that the library function causes, based on the simulated side-effect behaviors of the library function (e.g., as described in the side-effect summary) and the program contexts in which the library function is called in a computer program that is being compiled. Then, the compiler is able to identify, and optionally, perform appropriate optimization procedures on the program code based on its knowledge of the side effects. Library functions provided only in object form are one type of program functions that may benefit from the side-effect simulation framework described in this specification. In addition, side-effect behaviors of other types of program functions for which source code is available but may be too complex or time-consuming for direct side-effect analysis, can also be simulated by one or more suitable prototype functions provided by a programmer of the program functions.

In general, one innovative aspect of the subject matter described in this specification can be embodied in methods that include the actions of: receiving a function declaration for a program function, the function declaration referring to a first prototype function for the program function, the first prototype function differing from the program function; simulating, by a processor, at least a first function side-effect behavior of the program function based on a first function side-effect behavior of the first prototype function; and based on the simulated first function side-effect behavior of the program function, identifying one or more optimizations for a program in which the program includes at least a first call to invoke the program function.

Other embodiments of this aspect include corresponding systems, apparatus, and computer programs.

These and other aspects can optionally include one or more of the following features.

In some implementations, identifying the one or more optimizations for the program further includes the actions of: determining a first program context in which the first call occurs in the program; determining, based at least in part on the simulated first function side-effect behavior of the program function, respective first function side-effects of the program function that are specific to the first program context; and determining at least some of the one or more optimizations for the program based on the respective first function side-effects.

In some implementations, the one or more optimizations include at least one inter-procedure optimization.

In some implementations, the first function side-effect behavior includes one of a memory access behavior, a device Input/Output behavior, an aliasing behavior, a memory fence behavior, a network Input/Output behavior, an atomic memory operation behavior, or an explicit synchronization behavior.

In some implementations, the function declaration and the source code of the first prototype function are provided in an interface file for a software library that contains object code of the program function.

In some implementations, the source code of the first prototype function is a simplified version of the source code of the program function, and written in a same programming language as the source code of the program function.

In some implementations, the source code of the first prototype function includes an indicator that informs a compiler not to generate object code for the first prototype function.

In some implementations, simulating at least the first function side-effect behavior of the program function based on a first function side-effect behavior of the first prototype function further includes the actions of: analyzing source code of the first prototype function, the source code of the first prototype function differing from source code of the program function and configured to simulate at least the first function side-effect behavior of the program function; and generating a summary based on the analyzing, the summary including a description of the first function side-effect behavior of the program function.

In some implementations, the function declaration further refers to a second prototype function associated with the program function, source code of the second prototype function differs from the source code of the program function and is configured to simulate at least a second, different function side-effect behavior of the program function.

In some implementations, the function declaration indicates that the first prototype function simulates the first function side-effect behavior and that the second prototype function simulates the second function side-effect behavior.

In some implementations, the methods further include the actions of: analyzing the source code of the second prototype function to determine respective second function side-effect behavior of the function; and including a description of the second function side-effect behavior of the function in the summary.

Particular embodiments of the subject matter described in this specification can be implemented to realize one or more of the following advantages.

Compilers generally attempt to derive side-effect information from available program code directly. However, such attempts are often unsuccessful due to unavailability of source code for some program functions (e.g., for library functions provided in object code form) and/or high complexity of the source code for some program functions. By supplying source code of one or more prototype functions that is configured to simulate the function side-effect behaviors of a library function, the provider of the library function can inform the compiler of the functional side effects of the library function in various specific program contexts without exposing the proprietary details in the source code of the library function.

In addition, the source code of the prototype functions for a library function is often much simpler than the source code of the library function. A programmer of the library function can easily create the prototype functions for the library function based on the source code of the library function, for example, according to a few simple guidelines. Furthermore, even if the source code of a library function were available to the compiler, the compiler is likely to gain a better understanding the side-effect behaviors of the library function based on an analysis of the source code of the prototype functions than an analysis of the source code of the library function.

A programmer can provide the prototype functions for complex program functions even if the source code of the program functions would be made available to the compiler. By analyzing the prototype functions, the complier can ascertain the functional side effect behaviors of the complex program functions more quickly, and without getting confused by the complexities in the program functions. Furthermore, many large-scale programs contain long chains of function calls, the side effects of these function calls may be analyzed through semantic translation and continuous merging, which does not scale well and often includes approximations leading to decreased optimization level. Using prototype function description of the side effect can help circumvent the needs to perform in-depth analysis of the entire chains of function calls, and improving scalability of the optimization process.

In addition, the prototype function of a program function can be written in the same programming language as the source code of the program function. Programmers do not have to learn or use another language (e.g., an attribute annotation language) in order to describe the function side-effect behaviors of the program function. Furthermore, unlike attribute annotations of function side-effect behaviors, the source code of prototype functions need not be compiler-specific. The same prototype functions can be provided to different types of compilers, and the compilers can generate the correct summaries of the side-effect behaviors based on their own analysis of the prototype functions, rather than relying on the attribute annotations provided by the programmers. Each compiler can also decide on what compiler-specific optimizations to perform based on the side-effect summaries the compiler has generated by itself.

Furthermore, multiple prototype functions can be provided for a single program function (e.g., a library function provided in object form or a procedure implemented by source code in a program), where each prototype function is written to simulate a small number of function side-effect behaviors of the program function, such as one or two types of function side-effect behaviors. By limiting the types of function side-effect behaviors each prototype function is configured to simulate, the source code of the prototype function can be kept relatively compact and easy to write. At the same time, the shorter and simpler prototype functions are easier for the compiler to analyze to deduce the correct and useful information without getting confused by the source code of the prototype functions.

Furthermore, the same prototype function can be used to simulate a type of function side-effect behavior of multiple program functions that have different source code implementations and uses, but identical function side-effect behaviors. For example, the same prototype function can be referred to by the respective function declaration of each of the multiple program functions, and the compiler only needs to analyze the prototype function once to know the function side-effect behaviors of the multiple program functions. Thus, the speed and efficiency of the compiler optimization process can be improved as well.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A illustrates an example interface file containing a function declaration that references a prototype function of a program function.

FIG. 2B illustrates an example source code implementation of the prototype function in contrast to the source code of the program function declared in FIG. 2A.

FIG. 2C illustrates an example program context in which the program function is called in a computer program.

FIG. 3 is a flow diagram of an example process for identifying compiler optimizations for a computer program by simulating a function side-effect behavior of a program function called in the computer program, based on side-effect analysis of a prototype function associated with the program function.

FIG. 4 is a flow diagram of an example process for determining the exact function side effects of the program function and appropriate program optimizations based on the call context of the program function and the simulated side-effect behavior of the program function derived from the prototype function.

Like reference numbers and designations in the various drawings indicate like elements.

DETAILED DESCRIPTION

Figure 1:
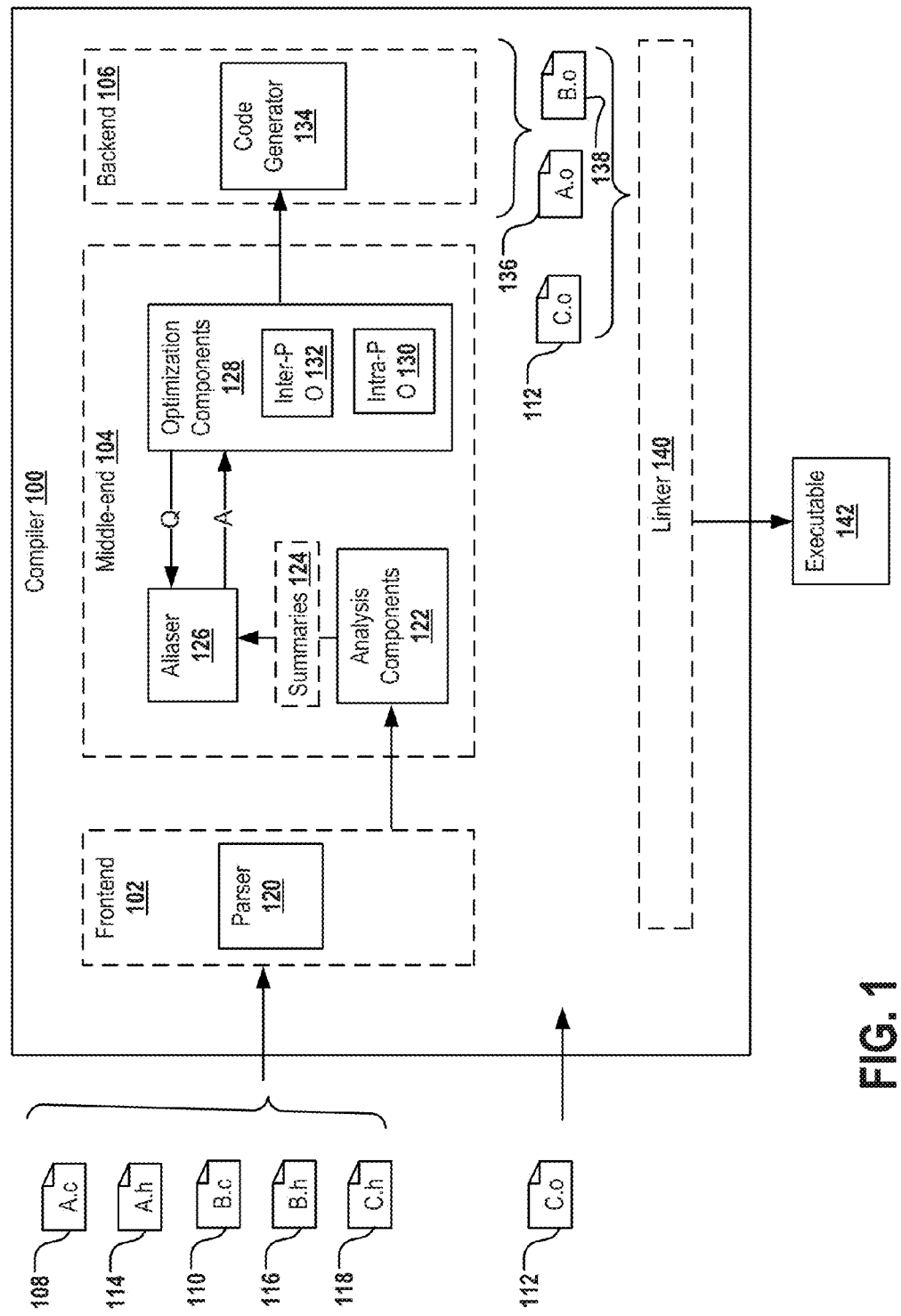
FIG. 1 is a block diagram illustrating an example compiler environment.

FIG. 1 illustrates an example compiler environment 100. A compiler is a special program or set of programs that can translate a computer program written in the source language (e.g., C, C++, Java, etc.) into a set of low-level machine instructions in the target language or object language.

In practice, a program typically includes multiple source code files from which a number of object code files can be derived. In addition, the source code files may include expressions that make references or calls to subroutines included in one or more software libraries (e.g., the standard I/O library, math library, or other general or special purpose libraries). The software libraries are often provided by third parties in object code form. The software libraries are typically accompanied by one or more interface files (e.g., header files) that provide function declarations or type definitions for the program functions and variables included in the software libraries.

The declaration of a program function can specify the name of the program function, and optionally, the input and output types of the program function. For example, a function declaration of a program function "print_int" written in C can be void print_int (int);

This function declaration specifies the name of the function (e.g., "print_int"), and specifies that the function takes one input value of the type "int," and does not produce an output value.

The exact definition or implementation of the function "print_int" can be provided in source code form or in a library provided in object code form. An example definition or implementation of the function "print_int" can be

```
void print_int (int x)
{
    printf("%d\n", x);
}
```

After having processed the declaration provided in the interface files, the compiler allows references or calls made to the function "print_int" in the rest of the program. The compiler can generate one or more object code files based on the source code provided to the compiler. In a multi-pass compiler, the order by which the compiler processes the declaration and the implementation of the function do not matter. Most compilers also include a linker component that links (or combines) the object files generated from the source code files, and the libraries that were referred to in the source code files, to create a single executable program.

As shown in FIG. 1, the example compiler environment 100 can be roughly divided into three parts: a frontend 102, a middle-end 104, and a backend 106.

The frontend 102 checks whether the program is correctly written in terms of the programming language syntax and semantics. For example, the frontend 102 can receive the source code files (e.g., source code files 108 and 110), as well as interface files associated with the source code files and library files (e.g., header files 114, 116, and 118). The frontend 102 can include a parser component 120 that parses the source code of the program and generates an internal representation of the program (e.g., called an IR or intermediate representation) for use by the middle-end 104. A parse tree (also called a "syntax tree") is an example of a high-level intermediate representation. The frontend 102 also manages the symbol table, a data structure mapping each symbol in the source code to associated information such as location, type, and scope. The IR (e.g., the syntax tree) can be analyzed, augmented, and transformed by later phases in the compiler, e.g., by the middle-end 104.

The middle-end 104 is where most compiler optimizations can take place. Typical compiler optimization techniques include, for example, dead code elimination, constant propagation, loop unrolling, inlining, and so on. The middle-end 104 includes a set of analysis components 122 that can analyze the intermediate representations provided by the frontend 102.

Typical analyses that are performed by the middle-end 104 include data flow analysis, mod/ref analysis, dependency analysis, alias analysis (including pointer analysis, escape analysis), and so on. Accurate analysis is the basis for possible compiler optimizations. Call graphs and control flow graphs are usually built during the analysis phase. The result of the analysis can be written into summary files 124 that are used by the optimization components.

An important aspect of the analysis performed by the analysis components 122 is to determine the side-effect behaviors of the expressions and program functions that appear in the computer-program. The expressions and program functions can be provided to the compiler both in source code form (e.g., as functions defined in the source code files 108 and 110, and/or as functions provided in object code form in the library file 112). A function or expression is said to have a side effect if, in addition to producing a value, the function or expression also modifies some state of the program, has an observable interaction with a calling function, or affects parts of the program that are outside the call location. For example, a function may modify a global or static variable, modify one of its arguments, raise an exception, write data to a display or file, read data, or call other side-effecting functions. In the presence of side effects, a program's behavior can be dependent on the order by which expressions are evaluated and by the order by which instructions are executed.

Therefore, the compiler needs to determine whether a particular optimization procedure would interfere with the function side effects of a program function given a particular program context (e.g., the call context and the particular input variables or pointers received by the program function at the call location). If the compiler cannot be certain that no such interference would occur in the particular program context, the complier would forgo the particular optimization procedure so as to avoid possible unintended consequences that would result from the transformations caused by the particular optimization procedure.

As shown in FIG. 1, the analysis components 122 can provide the results of the various analyses (e.g., in summary files 124) to an aliaser 126. The aliaser 126 is a component that receives queries from optimization components 128 regarding particular variables and functions that are encountered at various locations in the program. The aliaser 126 can make deductions regarding the possible side-effects that a program function can have based on the program context information provided in the queries as well as the analysis results stored in the summary files 124.

The optimization components 128 can identify and perform appropriate optimizations within a single program function or code block (e.g., intra-procedure optimizations 130) and/or optimizations that are applied across multiple program functions or multiple source code files (e.g., inter-procedural optimizations 132). Common optimization techniques include loop optimization, data flow optimization, dead code elimination, inline expansion, constant propagation, register allocation, automatic parallelization, and so on.

The various optimizations performed by the optimization components 128 transform the intermediate representations, and the transformed intermediate representations are provided to the backend 106. The backend 106 can include a code generating component 134. The code generating component 134 can further transform the intermediate representations and generate the object code for the source code that have been received by the compiler 100. Further lower-level optimizations (e.g., instruction selection, register allocation, and instruction scheduling, etc.) can be performed by the code generating component 134. The code generating component 134 output the object code files (e.g., the object code files 136 and 138) for the source code files (e.g., the source code files 108 and 110).

The object code files (e.g., the object code files 136 and 138) output by the backend 106 can be combined with the library object code (e.g., the object code file 112) by a linker 140 into the final optimized executable program 142.

As set forth earlier, the extent that particular optimization procedures can be applied to a computer program depends on the respective side effects of program functions called in the program. If certain optimization techniques are enabled in the compiler (e.g., by a user), the compiler tries to perform necessary analysis to obtain as much information on the relevant side-effect behaviors as it can from the available source code of the computer program. However, such attempts may only result in a limited amount of ascertainable information because some portions of the computer program refer or make calls to program functions or variables whose exact definitions are not available to the compiler.

For example, the computer program can include, at various locations in the program source code, calls to a program function that is provided to the compiler only in object code form. Without access to the source code of the program function, the analysis components of the compiler would not know the various types of side-effect behaviors that the program function can have, such as memory access behaviors, device I/O behaviors, aliasing behaviors, memory fence behaviors, network I/O behaviors, atomic memory operation behaviors, explicit synchronization behaviors, and so on.

For another example, even if the program includes calls to program functions whose source code is available to the compiler. Some of the source code can be very complex and time-consuming to analyze. Sometimes, the compiler can take a long time to analyze the source code of particular program functions, but cannot deduce much ascertainable information from the source code before abandoning the effort due to the high complexity of the source code of the program functions.

Without having much ascertainable information on the side-effect behaviors of a program function, the compiler would not be able to deduce the exact side effects the program function can have for a given program context (e.g., the code patterns surrounding the call location, and the specific variable or pointer inputs received by the program function at the call location). Therefore, in such situations, the compiler has to assume the worst about the side effects of the program function when determining whether an optimization procedure can be performed. For example, without knowing the exact memory access behavior (e.g., an example type of function side-effect behavior) of a program function, the compiler assumes that the program function can possibly access all memory locations of the program. For another example, without knowing exactly which variables or functions interact with the program function, the compiler assumes that the program function can possibly interact with all other variables and functions.

Thus, the lack of ascertainable information about the function side-effect behaviors of the program functions in the computer program can cause severe limitations on the amount and types of optimization procedures that can be safely carried out on the components of the program.

The framework described in this specification utilizes prototype functions to simulate the function side-effect behavior(s) of program functions. The source code of the prototype functions can be prepared by programmers that understand or have access to the source code of the program functions. The source code of the prototype functions can be written in the same programming language as the source code of the program functions. The source code of the prototype functions do not have to include all of the implementation details in the source code of the program functions. Instead, the source code of each prototype function can include only a small number of pertinent statements that captures one or more types of side-effect behaviors of the program function. Therefore, the provider of the program function does not have to master an annotation language in order to provide useful information on the side-effect behaviors of the program functions. Furthermore, the compilers can analyze the prototype functions to determine the function side-effect behaviors of the program functions, rather than having to rely on the programmers' annotation descriptions, which can be error-prone.

In addition, many large programs include many functions and long chains of function calls. When side-effect analysis are performed a function, the chains of function calls that originate from the function may be analyzed through semantic translation and continuous merging. In practice, this analysis is time consuming and does not scale well, so compilers may have to approximate in the analysis results, leading to loss of accuracy in the side-effect analysis results. This may cause decrease in the optimization level for the program. When side-effects of a function is described in a prototype function as set forth in this specification, prototype functions can be provided for the high-level functions in the chains of function calls, and the compiler can use the side-effect summaries of the high-level functions directly, and avoid having to analyze the code for the entire chains of functions that originate from the high-level functions. Thus, the optimization can become highly scalable, and more efficient.

In addition, multiple prototype functions can be provided for a single program function, where each prototype function is written to simulate a small number of function side-effect behaviors of the program function, such as one or two types of function side-effect behaviors. By limiting the types of function side-effect behaviors each prototype function is configured to simulate, the source code of the prototype function can be kept relatively compact, and easy to write. At the same time, the shorter and simpler prototype functions are easier for the compiler to analyze to deduce correct and useful information without getting confused by the source code of the prototype functions.

Furthermore, the same prototype function can be used to simulate a type of function side-effect behavior of multiple program functions that have different source code implementations and uses, but identical function side-effect behaviors. For example, a single prototype function "prototype_sort" for a program function "magic_sort," (as in the example shown in FIGS. 2-3) can be used for other program functions such as "quick_sort," "merge_sort," "insertion_sort," "radix_sort," and so on. The compiler only needs to analyze the prototype function once to know the function side-effect behaviors of the multiple program functions. Thus, the speed and efficiency of the compiler optimization process can be improved as well.

When a prototype function is provided to the compiler along with the object code of a program function referenced in a computer program, the compiler can be informed of the relationship or association between the prototype function and the program function in various ways. For example, a file can be provided to the compiler that indicates to the compiler what type(s) of function side-effect behaviors each prototype function is configured to simulate, and which program functions are associated with the prototype function and have their function side-effect behaviors simulated by the prototype functions. In some implementations, the file can also instruct the compiler to use the source code of the prototype functions to create side-effect summaries for the program functions rather than the source code of the program functions, even if the source code of the program functions were available to the compiler. A side-effect summary can be a text file or intermediate representation that includes descriptions of the program function's function side-effect behavior(s) that can be interpreted and understood by the compiler.

For another example, the provider of the program functions can also utilize some existing mechanisms available in the compiler to provide the information on the association between program functions and respective prototype functions that simulate the various function side-effect behaviors of the program functions. For example, some programming languages require the programmers to provide a function declaration for each program function called in a computer program. In addition to the function name and the input and output types, the function declaration can also include an optional attribute specification. Instead of providing side-effect annotations in the attribute specification of a function declaration, a programmer can use the attribute specification to inform the compiler about the prototype functions associated with the function program being declared, and the associated side-effect types of the prototype functions.

For a more specific example, in a GNU C compiler, the keyword "_attribute_" in a function declaration allows a programmer to specify special additional information about the function when making a declaration. This keyword is followed by an attribute specification inside double parentheses. Examples of existing defined attribute specifications include, for example, aligned, alloc_size, noreturn, format, malloc, alias, nonnull, gnu_inline, externally_visible, and so on. Additional attributes may be defined by plug-ins to the compiler. A plug-in can be provided to a compiler to implement the attribute specifications described in this specification, for example.

FIG. 2A illustrates an example interface file 200 (e.g., a header file "sort.h"). In this example, the interface file 200 contains a function declaration 202 for a program function (e.g., a function "magic_sort"). As shown in FIG. 2A, the function declaration 202 specifies the name of the function (e.g., "magic_sort") and the input (e.g., "int * array" and "int size") and output (e.g., "void") of the function (e.g., "magic_sort"). The function declaration terminates with a semicolon to indicate to the compiler that it declares the function (e.g., "magic_sort") rather than provides the definition or exact implementation of the function "magic_sort"). The function declaration 202 further includes an attribute specification 204. The attribute specification is signaled to the compiler by a keyword (e.g., "_attribute_(( . . . ))").

As illustrated in FIG. 2A, within the attribute specification 204, the function declaration 202 includes an indicator or flag 206 (e.g., a "use_prototype" flag) that signals to the complier to use supplied prototype functions to determine the functional side-effect behaviors of the declared program function (e.g., the function "magic_sort"). In addition, the attribute specification 204 can specify the name(s) 208 of the prototype function(s) (e.g., "prototype_sort") and the type(s) 210 of side-effect behavior(s) that the prototype functions simulates (e.g., "memory" and "alias").

In addition to the attribute specification 204 provided in the interface file 200 (e.g., the header file "sort.h"), the source code implementation of the prototype function(s) referenced in the attribute specification 204 are also provided to the compiler. In some implementations, the source code of the prototype function(s) is provided in the same interface file 200 as the function declaration 202. In some implementations, the source code of the prototype function(s) is provided in one or more source code files separately from the interface file 200.

FIG. 2B illustrates an example source code implementation 212 of the prototype function (e.g., the prototype function "prototype_sort") in contrast to the source code 214 of the program function (e.g., the program function declared in FIG. 2A).

In some implementations, the prototype function of the program function has the identical type signature as the program function. For example, the prototype function associated with the program function "magic_sort" also takes input "int * array" and "int size" and returns no output (e.g., "void").

As shown in FIG. 2B, the source code 214 of the program function "magic_sort" can be obfuscated in object code form, and/or contain complex program structures. However, the source code 212 of the prototype function "prototype_sort" is much more simplified, as compared to the source code 214 of the program function. A programmer that has access to the source code 214 of the program function "magic_sort" can easily trim out the proprietary and/or implementation details in the source code 214, and replace them with simplified statements that replicate the function side-effect behaviors of the program function. Example guidelines for generating prototype functions that simulate the various types of side-effect behaviors of the original program function will be provided later in the specification.

Suppose that the source code 214 of the program function "magic_sort" accesses (e.g., read and write) the memory location "array[i]" sequentially in a loop, and the range of the memory access is array[0: size-1]. The accesses to the array[i] can involve complex computations using the values in array [i] that do not interact with or affect variables or functions outside of the function "magic_sort" other than the memory range "array[0:size-1]." Therefore, as shown in FIG. 2B, the source code 212 of the prototype function can simulate or represent the memory access and alias side-effect behaviors (e.g., pointer side-effect behaviors) of the program function "magic_sort" using a simple loop that accesses (e.g., read and write) the memory locations ranging between array[0:size-1]. The complex computations that do not produce side effects can be omitted partially or entirely within the source code 212 of the prototype function "prototype_sort."

There are typically many ways of expressing the function side-effect behaviors of a program function. Therefore, many different definitions or source code implementations of the prototype functions for the same program function are possible. In an extreme scenario, the source code of the program function itself can serve as the prototype function of the program function. However, in practice, the source code implementations of the prototype functions are typically different from the source code implementation of the program function. In addition, the source code of each prototype function associated with the program function does not have to simulate all of the function side-effect behaviors of the program function. For example, one prototype function can be configured to simulate the memory and aliasing side-effect behaviors of the program function, but not the I/O side-effect behavior, while another prototype function can be configured to simulate the I/O side-effect behavior without simulating the memory and aliasing side-effect behaviors of the program function.

After the compiler is informed of the availability of a prototype function for simulating a particular type of side-effect behavior of a program function, the compiler can retrieve and analyze the source code of the prototype function to determine the particular type of side-effect behavior of the program function. For example, when the interface file 200 and the source code implementation 212 of the prototype function "prototype_sort" are provided to the compiler 100 shown in FIG. 1 along with the object code of the program function "magic_sort," the interface file 200 and the source code implementation 212 of the prototype function "prototype sort" can be parsed by the parser 120 shown in FIG. 1. After the parsing, the compiler 100 recognizes that "prototype_sort" is provided for optimization analysis only and is not part of the computer program that is being compiled.

Continuing with the above example, the intermediate representations of the prototype function "prototype_sort" and the intermediate representations of other available source code are analyzed by the analysis components 122. The analysis components can perform the side-effect analysis on the prototype functions associate with the program function "magic_sort," and store the results of the analysis in a side-effect summary for the program function "magic_sort." In some implementations, the types of analysis performed on each prototype function can be specific to the type of side-effect behavior that the prototype function is configured to simulate. After the analysis components 122 have analyzed the available prototype functions, the analysis components 122 can store the result of the analysis (e.g., descriptions of the various types of side-effect behaviors) in a side-effect summary associated with the program function. The side-effect summary associated with the program function can be provide to the aliaser 126 along with the result of analysis performed on other parts of the program code.

After the side-effect analysis is completed and the side-effect summaries are stored, the optimization components 128 can start the optimization process. In order to determine which optimization procedures would improve the performance and efficiency of the program being compiled, the optimization components 128 need to know the exact function side effects of the program function in each particular program contexts where the program function is called. To determine the exact function side effects of the program function, the optimization components 128 make a query to the aliaser 126 about the program function, the query can identify the program function and the program context in which the program function is called. Information related to the program context can include the code patterns surrounding the call to the program function, the specific input variables and/or pointers that the program function receives at the call location, and so on. The aliaser 126 makes deduction on the exact function side effects of the program function based on the side-effect summary associated with the program function and the program context provided in the query. If the aliaser 126 is able to ascertain the exact function side effects of the program function in the program context, the aliaser 126 can provide the answers back to the optimization components 128. The optimization components 128 then decide on what optimization procedures can be performed safely on the program, and perform those optimization procedures that are determined to be safe and beneficial.

FIG. 2C illustrates an example program context in which the program function declared in FIG. 2A is called in an example computer program 230. As shown in the example program 230 (e.g., the program "table.c"), a variable "int stats" is declared, and a function 232 (e.g., the function "sort_rows") makes a functional call to the program function "magic_sort." Within the definition or source code implementation of the function 232 (e.g., the function "sort_rows"), an expression 234 that modifies the variable "int stats" exists after a functional call 236 to the program function "magic_sort." The optimization components 128 can query the aliaser 126 about whether the call 236 to the function "magic_sort" affects the value of the variable "int stats." The expression 234 that appears after the function call 236 can be provided as the program context or part thereof for the function program "magic_sort."

Based on the side-effect analysis results stored in the side-effect summary for the program function "magic_sort," the aliaser 126 can conclude that the call 236 to the program function "magic_sort" only affects the memory range "array [0:49]" and does not affect the value of "int stats." The aliaser 126 can further conclude that there is a loop within the program function "magic_sort," which can cause a substantial amount of latency in the evaluation of the expression 234. Therefore, the optimization components 128 can make an optimization decision to move the expression 234 to a location before the call 236 to the program function "magic_sort" or allow the expression 234 to be evaluated in parallel to the execution of the call 236 to the program function "magic_sort."

The example shown above with respect to FIGS. 2A-2C is merely one example of how prototype functions of a program function can be disclosed to the compiler and utilized in the optimization of a computer program that refers or makes calls to the program function. In an alternative example, the function declaration of the program function can be provided without the attribute specification 204. Instead, the source code implementation of the prototype function can be provided with an attribute specification that identifies the program function that the prototype function is associated with, and the type(s) of side-effect behaviors that the prototype function simulates. For example, in an interface file (e.g., "sort.h"), a function declaration of the program function "magic_sort" can be provided as void magic_sort (int * array, int size);

The interface file can further includes the source code implementation of one or more prototype functions associated with the program function "magic_sort." One example source code implementation of the prototype function can be provided as

```
void prototype_sort (int * array, int size)_attribute_((magic_sort, memory, alias))
{
    int i;
    for (i=0; i<size; i++)
        array[i]+=1;
}
```

As shown in the above example, the example attribute specification "_attribute_((magic_sort, memory, alias))" informs the compiler that "prototype_sort" is a prototype function of the program function "magic_sort," that the source code of the prototype function should be analyzed and used to determine the memory and aliasing function side-effect behaviors of the program function "magic_sort," and that a side-effect summary rather than object code should be generated for the source code of the prototype function "prototype_sort."

Other ways of specifying the association between a program function and its respective prototype functions are possible. Other ways of specifying the side-effect types associated with each prototype function are possible. In some implementations, the same prototype function can be associated with more than one program function and used to simulate the function side-effect behavior(s) of the program functions. In one example implementation, where the prototype function(s) are referenced in the function declarations of the program functions, then, the respective function declarations of multiple program functions can refer to the same prototype function. In another example implementation, where each prototype function declares its respective association with a program function in the prototype function's attribute specification, then, the prototype function can declare its associations with more than one program function. In each of these implementations, the source code implementations of each prototype function only needs to be provided to and analyzed by the compiler once, regardless of how many associated program functions the prototype function has.

In general, a programmer can create his or her own versions of the prototype function for a program function based on the source code of the program function. The prototype function is supposed to mimic the side effects of the program function. Some guidelines for generating the correct source code implementations of the prototype function include the following.

For example, for memory side effects, a prototype function computes all the values used in memory indexing in the original program source code, and then references the indexed memory locations with the same write/read combination of operations as the original program source code.

In various implementations, the rules that guarantee that the prototype functions stay representative for memory and aliasing side effect behaviors, while keeping the prototype functions compact and easy to analyze by the compiler include the following:

1. The prototype has the same signature as the original program function;
2. A sequence of memory access to a given memory location M is representative if and only if:
    (a) if the original sequence of memory access starts with a write, the representative sequence also start with a write;
    (b) if the original sequence of memory access contains a write, the representative sequence also contain a write; and
    (c) is the original sequence of memory access contains a read, the representative sequence also contains a read;
3. If the original program function exposes the address of an object to the call context, the prototype replicates this behavior; and
4. The prototype function replicates behaviors relevant to side-effects from system interactions, including memory access, memory fences, access to volatile data, file system and other device operations, file and network I/O operations, atomic memory operations, and/or explicit synchronizations.

The above guidelines are merely illustrative. Other guidelines are possible.

FIG. 3 is a flow diagram of an example process 300 for identifying compiler optimizations for a computer program by simulating a function side-effect behavior of a program function called in the computer program, based on side-effect analysis of a prototype function associated with the program function. The example process 300 can be performed by a compiler, such as the compiler 100 shown in FIG. 1.

In the example process 300, the compiler receives a function declaration for a program function, where the function declaration specifies a signature of the program function and refers to a prototype function for the program function (302), the prototype function differing from the program function. The step 302 can be generalized for other implementations where the association between the prototype function and the program function is not specified in the function declaration of the program function. In some implementations, the compiler can receive information on the association between the prototype function and the program function in other forms. In various implementations, the function declaration can be received and parsed by the parser 120 shown in FIG. 1, for example.

The compiler then simulates at least one function side-effect behavior of the program function based on a respective first function side-effect behavior of the prototype function (304).

For example, the compiler can analyzes the source code of the prototype function, where the source code of the prototype function differs from the source code of the program function and is configured to simulate at least one type of function side-effect behavior of the program function. The analysis can be performed by the analysis components 122 shown in FIG. 1, for example. The compiler can generate a side-effect summary (e.g., the summaries 124 shown in FIG. 1) based on the analyzing, and the side-effect summary includes a description of the first type of function side-effect behavior of the program function. Based on the simulated function side-effect behavior of the program function derived from the source code of the prototype function (e.g., as recorded in the side-effect summary), the compiler identifies, and optionally, performs one or more optimization procedures for a program that includes at least a first call to invoke the program function (306). The optimization procedures can be performed by the optimization components 128 shown in FIG. 1, for example.

FIG. 4 is a flow diagram of an example process 400 for determining function side effects of the program function and appropriate program optimizations based on the program context of the program function and the simulated function side effect behavior of the program function derived from the prototype function, and. The example process 400 can also be performed a compiler, such as the example compiler 100 shown in FIG. 1.

In the example process 400, the compiler determines a program context in which the call to the program function occurs in the program (402). For example, the program context can be provided to the aliaser 128 or determined by the aliaser 128 shown in FIG. 1. The compiler (e.g., the aliaser 128 of the compiler) then determines, based on the simulated first function side-effect behavior of the program function (e.g., as recorded in the side-effect summary), respective function side effects of the program function that are specific to the program context (404). The compiler determines, and optionally, performs at least some of the one or more compiler optimization procedures for the program based on the respective function side effects of the program function specific to the program context (406). For example, the optimization components 128 can receive the information on the function side effects from the aliaser 126, determine which optimization procedures can be performed, and then performs those optimization procedures.

In some implementations, the one or more optimization procedures implement at least one inter-procedure optimization technique. In some implementations, the one or more optimization procedures implement at least one intra-procedural optimization technique.

In some implementations, the function side-effect behavior includes one of a memory access behavior, a device I/O behavior, an aliasing behavior, a memory fence behavior, a network I/O behavior, an atomic memory operation behavior, or an explicit synchronization behavior. Other function-side effect behaviors are possible.

In some implementations, the function declaration and the source code of the prototype function are provided in an interface file accompanying a software library that contains object code of the program function. In some implementations, the source code of the prototype function is provided in a source code file separate from the interface file.

In some implementations, the source code of the prototype function is a simplified version of the source code of the program function, and written in the same programming language as the source code of the first program function. For example, the source code of the prototype function can be written according to the guidelines provided earlier in the specification.

In some implementations, the source code of the prototype function includes an indicator (e.g., an attribute specification or a predefined flag) that informs the compiler not to generate object code for the prototype function.

In some implementations, the function declaration further refers to one or more other prototype function associated with program function, where the source code of each of these other prototype functions differs from the source code of the program function, and is configured to simulate at least one or more other function side-effect behaviors of the program function.

In some implementations, the function declaration indicates to the compiler that a first prototype function simulates a first function side-effect behavior of the program function and that a second prototype function simulates a second function side-effect behavior of the program function, and so forth.

In some implementations, the compiler further analyzes the source code of these other prototype functions to determine the respective function side-effect behaviors of the program function, and includes a description of each of the function side-effect behaviors of the program function in the side-effect summary of the program function.

Other example processes that can be performed by the compiler or a programmer are apparent from the descriptions provided in this specification. Computer-program products containing the source code of prototype functions along with the information specifying the association between the prototype functions and their respective associated program functions can be provided by the providers of software libraries that contain the program functions, either separately from the software libraries or along with the software libraries.

Figure 5:
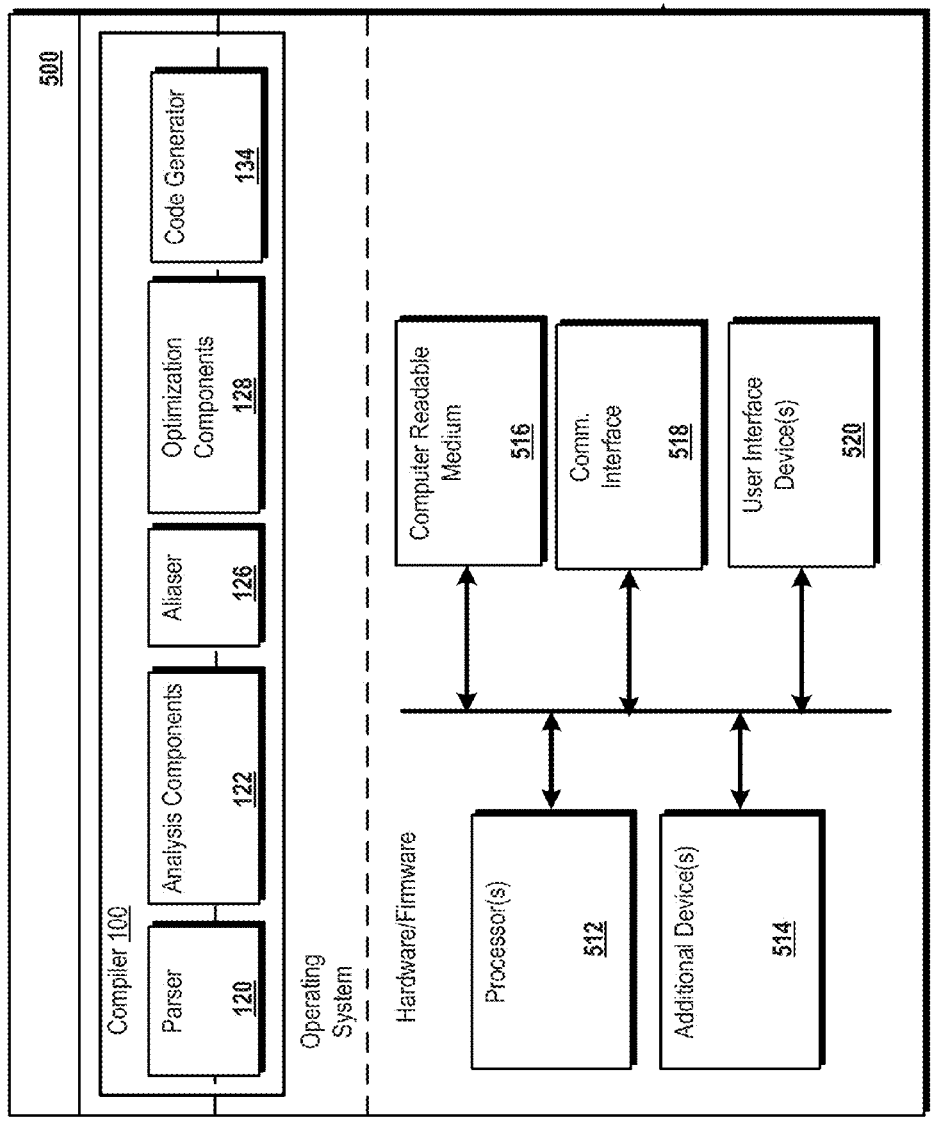
FIG. 5 is a block diagram of a generic computer.

FIG. 5 is a schematic diagram of an example computer system 500 on which an example compiler (e.g., the example compiler 100) described in this specification can be installed and run. The example computer system 500 includes one or more data processing apparatuses. While only one data processing apparatus is shown in FIG. 5, multiple data processing apparatus can be used. The system 500 includes various modules (e.g., executable software programs) that constitute the compiler 100. The modules include, for example, the parser 120 for parsing the source code files of the program to be compiled, as well as the source code of the prototype functions. The parser 120 can further process the declarations or files that specify the associations between various program functions and their respective prototype functions. The modules further include, for example, analysis components 122 and the aliaser 126. The analysis components 122 can analyze the source code of the prototype functions, and generate summaries for the program functions based on the results of the analysis. The analysis components 122 can further store the summaries and/or provide the summaries to the aliaser 126. The modules further include, for example, optimization components 128. The optimization components 218 can query the aliaser about the side effects of particular program functions in various call contexts associated with the particular program function in the program being compiled. The optimization components 218 can decide what optimization procedures to perform and how to perform the optimization procedures based on the answers provided by the aliaser 126. In addition, the modules can include a code generator component 134. The code generator can output the optimized object code based on the intermediate representations produced by the optimization components 218.

Each module runs as part of the operating system on the system 500, runs as an application on the system 500, or runs as part of the operating system and part of an application on the system 500, for instance. Although several software modules are illustrated, there may be fewer or more software modules. Moreover, the software modules can be distributed on one or more data processing apparatus connected by one or more networks or other suitable communication mediums.

The system 500 also includes hardware or firmware devices including one or more processors 512, one or more additional devices 514, a computer readable medium 516, a communication interface 518, and one or more user interface devices 520. Each processor 512 is capable of processing instructions for execution within the server 500. In some implementations, the processor 512 is a single or multi-threaded processor. Each processor 512 is capable of processing instructions stored on the computer readable medium 516 or on a storage device such as one of the additional devices 514. The system 500 uses its communication interface 518 to communicate with one or more other computers, for example, over a network. Examples of user interface devices 520 include a display, a camera, a speaker, a microphone, a tactile feedback device, a keyboard, and a mouse. The system 500 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implement method, comprising:
receiving a function declaration for a program function, the function declaration referring to a first prototype function for the program function, the first prototype function differing from the program function, wherein source code of the first prototype function is a simplified version of source code of the program function and written in a same programming language as the source code of the program function, and the source code of the first prototype function includes an indicator that informs a compiler of a relationship among the program function, the first prototype function, and a functional side-effect behavior simulated by the first prototype function;
simulating, by a processor, at least a first function side-effect behavior of the program function based on a first function side-effect behavior of the first prototype function;
based on the simulated first function side-effect behavior of the program function, identifying one or more optimizations for a program that includes at least a first call to invoke the program function;
generating intermediate source code based on the source code of the program function and the one or more optimizations; and
generating object code based on the intermediate source code, while ignoring the first prototype function.

2. The method of claim 1, wherein identifying the one or more optimizations for the program further comprises:
determining a first program context in which the first call occurs in the program;
determining, based at least in part on the simulated first function side-effect behavior of the program function, respective first function side-effects of the program function that are specific to the first program context; and
determining at least some of the one or more optimizations for the program based on the respective first function side-effects.

3. The method of claim 1, wherein the one or more optimizations include at least one inter-procedure optimization.

4. The method of claim 1, wherein the first function side-effect behavior includes one of a memory access behavior, a device Input/Output behavior, an aliasing behavior, a memory fence behavior, a network Input/Output behavior, an atomic memory operation behavior, or an explicit synchronization behavior.

5. The method of claim 1, wherein the function declaration and source code of the first prototype function are provided in an interface file for a software library that contains object code of the program function.

6. The method of claim 1, wherein simulating at least the first function side-effect behavior of the program function based on a first function side-effect behavior of the first prototype function further comprises:
analyzing source code of the first prototype function, the source code of the first prototype function differing from source code of the program function and configured to simulate at least the first function side-effect behavior of the program function; and
generating a summary based on the analyzing, the summary including a description of the first function side-effect behavior of the program function.

7. The method of claim 6, wherein the function declaration further refers to a second prototype function associated with the program function, source code of the second prototype function differs from the source code of the program function and is configured to simulate at least a second, different function side-effect behavior of the program function.

8. The method of claim 7, wherein the function declaration indicates that the first prototype function simulates the first function side-effect behavior and that the second prototype function simulates the second function side-effect behavior.

9. A computer-readable non-transitory medium having instructions stored thereon, the instructions, when executed by one or more processors, cause the processors to perform operations comprising:
receiving a function declaration for a program function, the function declaration referring to a first prototype function for the program function, the first prototype function differing from the program function, wherein source code of the first prototype function is a simplified version of source code of the program function and written in a same programming language as the source code of the program function, and the source code of the first prototype function includes an indicator that informs a compiler of a relationship among the program function, the first prototype function, and a functional side-effect behavior simulated by the first prototype function;
simulating at least a first function side-effect behavior of the program function based on a first function side-effect behavior of the first prototype function;
based on the simulated first function side-effect behavior of the program function, identifying one or more optimizations for a program that includes at least a first call to invoke the program function;

generating intermediate source code based on the source code of the program function and the one or more optimizations; and generating object code based on the intermediate source code, while ignoring the first prototype function.

10. The computer-readable non-transitory medium of claim 9, wherein identifying the one or more optimizations for the program further comprises:

determining a first program context in which the first call occurs in the program;

determining, based at least in part on the simulated first function side-effect behavior of the program function, respective first function side-effects of the program function that are specific to the first program context; and determining at least some of the one or more optimizations for the program based on the respective first function side-effects.

11. The computer-readable non-transitory medium of claim 9, wherein the one or more optimizations include at least one inter-procedure optimization.

12. The computer-readable non-transitory medium of claim 9, wherein the first function side-effect behavior includes one of a memory access behavior, a device Input/Output behavior, an aliasing behavior, a memory fence behavior, a network Input/Output behavior, an atomic memory operation behavior, or an explicit synchronization behavior.

13. The computer-readable non-transitory medium of claim 9, wherein the function declaration and source code of the first prototype function are provided in an interface file for a software library that contains object code of the program function.

14. The computer-readable non-transitory medium of claim 9, wherein simulating at least the first function side-effect behavior of the program function based on a first function side-effect behavior of the first prototype function further comprises:

analyzing source code of the first prototype function, the source code of the first prototype function differing from source code of the program function and configured to simulate at least the first function side-effect behavior of the program function; and generating a summary based on the analyzing, the summary including a description of the first function side-effect behavior of the program function.

15. The computer-readable non-transitory medium of claim 14, wherein the function declaration further refers to a second prototype function associated with the program function, source code of the second prototype function differs from the source code of the program function and is configured to simulate at least a second, different function side-effect behavior of the program function.

16. The computer-readable non-transitory medium of claim 15, wherein the function declaration indicates that the first prototype function simulates the first function side-effect behavior and that the second prototype function simulates the second function side-effect behavior.

17. A system comprising:
one or more processors; and
memory having instructions stored thereon, the instructions, when executed by the one or more processors, cause the processors to perform operations comprising:
receiving a function declaration for a program function, the function declaration referring to a first prototype function for the program function, the first prototype function differing from the program function, wherein source code of the first prototype function is a simplified version of source code of the program function and written in a same programming language as the source code of the program function, and the source code of the first prototype function includes an indicator that informs a compiler of a relationship among the program function, the first prototype function, and a functional side-effect behavior simulated by the first prototype function;

simulating at least a first function side-effect behavior of the program function based on a first function side-effect behavior of the first prototype function;

based on the simulated first function side-effect behavior of the program function, identifying one or more optimizations for a program that includes at least a first call to invoke the program function;

generating intermediate source code based on the source code of the program function and the one or more optimizations; and generating object code based on the intermediate source code, while ignoring the first prototype function.

18. The system of claim 17, wherein identifying the one or more optimizations for the program further comprises:

determining a first program context in which the first call occurs in the program;

determining, based at least in part on the simulated first function side-effect behavior of the program function, respective first function side-effects of the program function that are specific to the first program context; and determining at least some of the one or more optimizations for the program based on the respective first function side-effects.

19. The system of claim 17, wherein the one or more optimizations include at least one inter-procedure optimization.

20. The system of claim 17, wherein the first function side-effect behavior includes one of a memory access behavior, a device Input/Output behavior, an aliasing behavior, a memory fence behavior, a network Input/Output behavior, an atomic memory operation behavior, or an explicit synchronization behavior.

21. The system of claim 17, wherein the function declaration and source code of the first prototype function are provided in an interface file for a software library that contains object code of the program function.

22. The system of claim 17, wherein simulating at least the first function side-effect behavior of the program function based on a first function side-effect behavior of the first prototype function further comprises:

analyzing source code of the first prototype function, the source code of the first prototype function differing from source code of the program function and configured to simulate at least the first function side-effect behavior of the program function; and generating a summary based on the analyzing, the summary including a description of the first function side-effect behavior of the program function.

23. The system of claim 22, wherein the function declaration further refers to a second prototype function associated with the program function, source code of the second prototype function differs from the source code of the program function and is configured to simulate at least a second, different function side-effect behavior of the program function.

24. The system of claim 23, wherein the function declaration indicates that the first prototype function simulates the first function side-effect behavior and that the second prototype function simulates the second function side-effect behavior.

* * * * *